United States Patent
Elman et al.

(10) Patent No.: US 6,340,424 B1
(45) Date of Patent: Jan. 22, 2002

(54) MANUFACTURE OF COMPLEXLY SHAPED ARTICLES USING AN AUTOMATED DESIGN TECHNIQUE

(75) Inventors: Larisa Alexandra Elman, Swampscott; Steven Michael Burgess, Lynnfield; Zhuo-Ru Ding, Brighton, all of MA (US)

(73) Assignee: General Electrical Company, Cincinnati, OH (US)

( * ) Notice: Subject to any disclaimer, the term of this patent is extended or adjusted under 35 U.S.C. 154(b) by 0 days.

(21) Appl. No.: 09/640,923

(22) Filed: Aug. 17, 2000

(51) Int. Cl.$^7$ ............................................... B23H 3/00
(52) U.S. Cl. ............... 205/645; 29/407.05; 29/889.23; 29/888.025; 29/889.7; 264/40.1; 425/140
(58) Field of Search ................... 205/645, 649; 264/40.1, 40.4; 425/140, 141; 29/407.05, 889.23, 888.025, 889.7, 407.01

(56) References Cited

U.S. PATENT DOCUMENTS

| | | | | |
|---|---|---|---|---|
| 4,851,090 A | * | 7/1989 | Burns et al. | 204/129.7 |
| 6,007,319 A | * | 12/1999 | Jacobson | 425/140 |
| 6,238,186 B1 | * | 5/2001 | Sato et al. | 416/223 R |

* cited by examiner

Primary Examiner—Kathryn Gorgos
Assistant Examiner—Thomas H Parsons
(74) Attorney, Agent, or Firm—Andrew C. Hess; V. Ramaswamy (57) ABSTRACT

An integrated compressor disk and compressor blade (BLISK) having a specified shape is prepared by an electrochemical machining process having a cathode defined by a set of cathode shape parameters. A trial BLISK is prepared using a cathode defined by a set of trial shape parameters, and a set of deviations of the trial shape from the specified shape at a plurality of surface grid points on a surface of the trial article is measured. A set of revised cathode shape parameters is determined using at least one reshaping routine specific to the BLISK. A reshaped article is prepared using the electrochemical machining process and a reshaped cathode defined by the revised cathode shape parameters.

19 Claims, 11 Drawing Sheets

MANUFACTURE OF COMPLEXLY SHAPED ARTICLES USING AN AUTOMATED DESIGN TECHNIQUE

BACKGROUND OF THE INVENTION

1. Field of the Invention

This invention relates to the manufacture of complexly shaped articles such as BLISKs, and, more particularly, to a manufacturing process incorporating an iterative technique to refine tooling design.

2. Description of the Related Art

Some complexly shaped articles are manufactured by techniques which require the development of specially shaped tooling that accomplishes the shaping of the workpiece. In an example of particular interest, an integral compressor blade/disk (BLISK) structure for a gas turbine engine is manufactured as a single integral piece by electrochemical machining (ECM). In ECM, a cathode is positioned adjacent to the workpiece, and an electrical circuit is established with an electrolyte flowing between the cathode and the workpiece. A current flows through the cathode and the workpiece, removing metal from the workpiece and into the electrolyte. The cathode is gradually moved toward the workpiece as the shape of the electrochemically machined workpiece becomes closer to that of the cathode. At the conclusion of the process, the workpiece is shaped similarly to the cathode.

If the workpiece had exactly the shape of the cathode on the first try, there would be no need for any redesign of the cathode. However, because of a number of factors such as the electrical field characteristics, the flow pattern of the electrolyte, and the shape of the workpiece, the first trial for the shape of the final machined article is generally not the same as that of the cathode. A redesign of the cathode is therefore required, followed by a second try at producing the workpiece. In the conventional approach to the redesign, a tabular point technique is used to compare the actual shape of the machined article with the desired shape. The cathode shape is redesigned to produce a closer correspondence between the shape of the next generation of the workpiece and the desired shape. This cathode and surface redesign is not without limitations, however, because the redesign must ensure that a smooth, aerodynamic shape of the final article is achieved.

Experience has shown that, even for experienced manufacturing process designers, the redesign process is extremely tedious and costly. In the case of a BLISK, a total of 15–20 iterations is typically required. That is, it takes 15–20 iterations before the shape of the cathode converges on a final shape that produces the desired shape of the BLISK. Each iteration requires a redesign, manufacture of a new cathode, electrochemical machining of a new BLISK (or at least part of the BLISK), and measurements of the shape of the BLISK. The next cathode is designed to overcome remaining shape differences with the desired shape and avoid changes which would introduce new shape problems. The design of a new BLISK and preparation of the workable ECM tooling typically requires 1–2 months.

Similar problems are encountered with other complexly shaped articles made by ECM and other manufacturing techniques.

There is a need for an improved approach to the manufacturing of complexly shaped articles. The present invention fulfills this need, and further provides related advantages.

BRIEF SUMMARY OF THE INVENTION

The present invention provides a method for producing complexly shaped articles that require redesign of manufacturing tooling. It is particularly useful in the design of a cathode for electrochemical machining. The approach produces results at least as good as those of conventional design techniques, and in some cases superior to those of conventional design techniques. The present methodology requires many fewer design iterations than conventional techniques, typically no more than 3 iterations as compared with 15–20 iterations for conventional procedures. A new complex article and its tooling may be produced in just a few days rather than requiring weeks.

The present method produces a complexly shaped article having a smoothly varying specified shape. The method uses a shaping process that operates with a set of shaping parameters, such as an electrochemical machining process wherein the shaping parameters define the cathode. The method comprises the steps of preparing a trial article having a trial shape using the shaping process, wherein the set of shaping parameters is a set of trial shaping parameters. A set of deviations of the trial shape from the specified shape at a plurality of surface grid points on a surface of the trial article is measured, to find how close the trial article is to the desired specified shape. A set of revised shaping parameters is determined by first defining at least one reshaping routine specific to the shaped article. Each reshaping routine repositions at least one adjacent surface grid point responsive to a repositioning of a repositioned surface grid point. The reshaping routine includes an automatic step of establishing a smoothly varying shape of the surface. The one or more reshaping routines are selected according to commonly required shape changes that are needed during the redesign process.

The designer selects a selected reshaping routine and operates the selected reshaping routine by repositioning a selected surface grid point using the selected reshaping routine. The reshaping routine responsively repositions at least one adjacent surface grid point and establishes a smoothly varying shape of the surface. The steps of selecting and repositioning are repeated, if necessary, for another surface grid point until all grid points on the surface of the trial shape are moved to locations defined by the specified shape. The steps of selecting, repositioning, and repeating produce the set of revised shaping parameters. A reshaped article is prepared using the shaping process with the set of revised shaping parameters from the step of determining. In the preferred case, the cathode of the electrochemical machining process has a shape according to the revised cathode shape parameters.

The present approach is based upon the recognition that the reshaping of the article may best be accomplished by attention to a number of grid points simultaneously rather than a single grid point. As one grid point on the surface is repositioned, adjacent grid points are also repositioned in a self-consistent manner so that the basic smooth surface shape is not compromised by the repositioning of specific grid points so as to be within the tolerance limits. The result is that the reshaping process is accomplished faster and with fewer iterations than heretofore possible.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
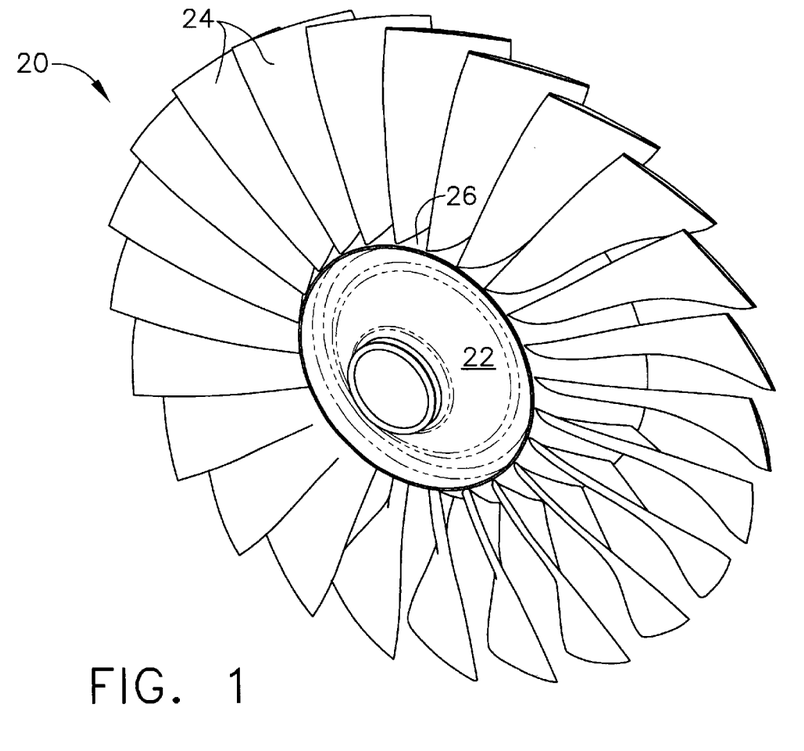
FIG. 1 is a perspective view of a BLISK.
Figure 2:
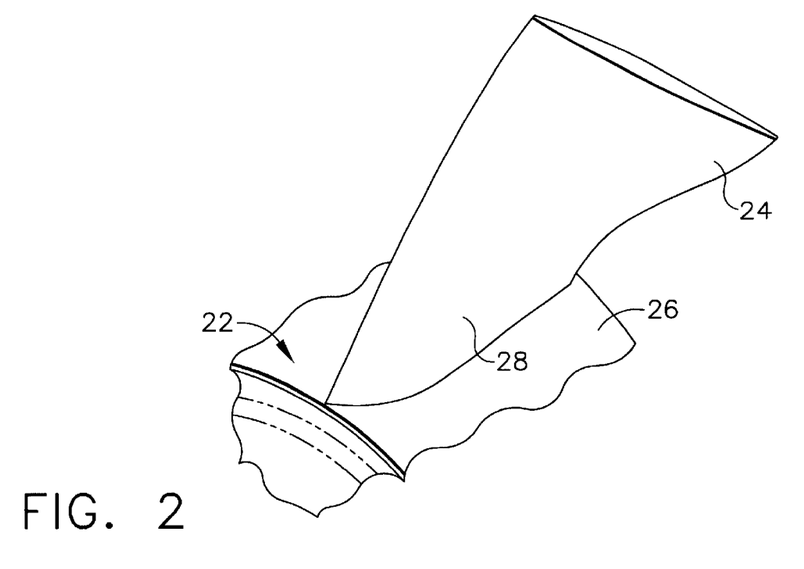
FIG. 2 is a detail of the BLISK of FIG. 1.

The present invention may be used in conjunction with a wide variety of articles and shaping processes. The inventors are interested in its application to the production of an integral compressor blade/disk structure or BLISK 20, illustrated in FIG. 1, by electrochemical machining. The BLISK 20 includes a compressor disk 22 and a number of compressor blades 24 extending from a periphery 26 of the compressor disk 22. The compressor disk 22 is mounted on a shaft (not shown) which rotates during the operation of a gas turbine engine. FIG. 2 illustrates one of the compressor blades 24 in greater detail. The compressor blade 24, which defines airfoil surfaces 28, is integral with the compressor disk 22. That is, the compressor blade 24 is manufactured as part of the same piece of metal as the compressor disk 22. In this preferred application, the compressor disk 22 and the compressor blade 24 are not manufactured separately and then joined or affixed together.

Figure 3:
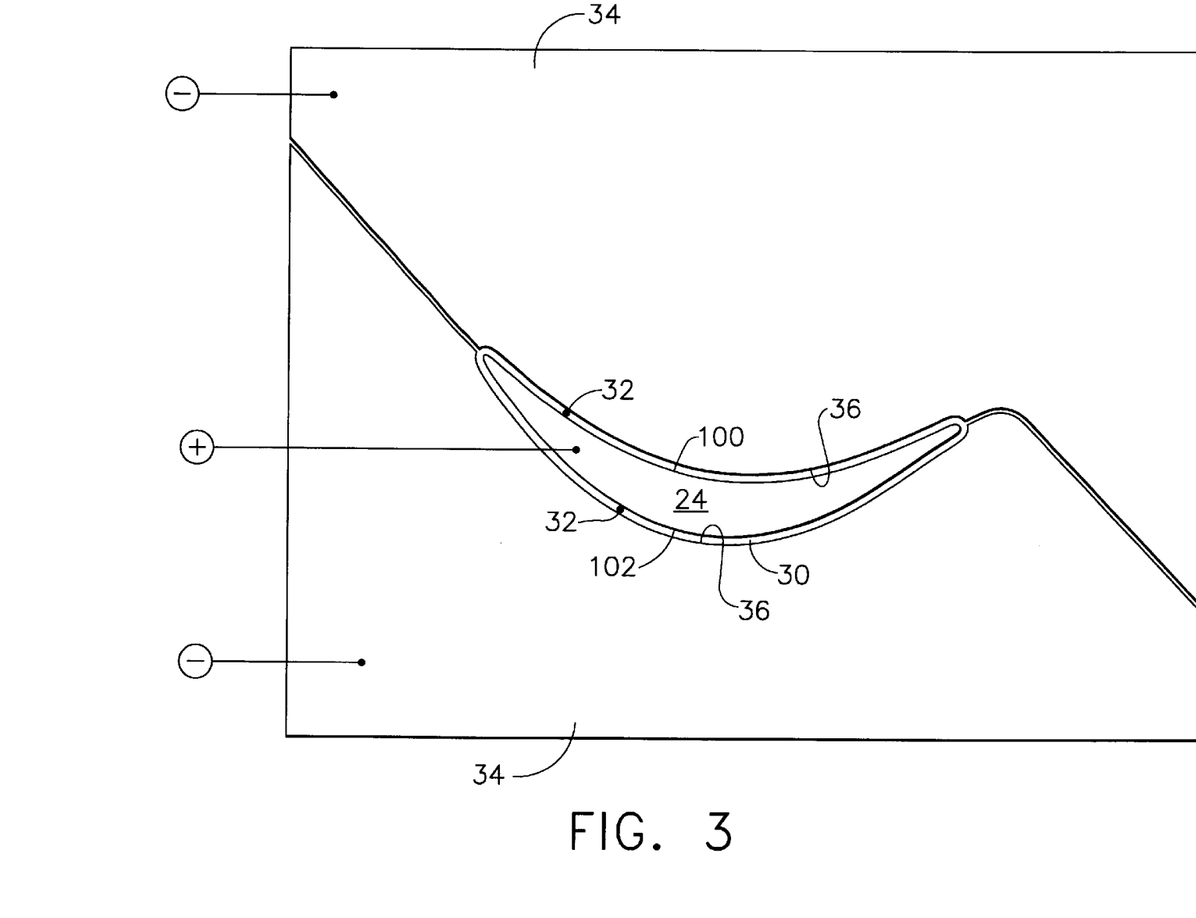
FIG. 3 is a schematic two-dimensional representation of an electrochemical machining apparatus for producing the compressor blade of FIGS. 1 and 2, with pertinent cathode and blade terminology indicated.

The BLISK 20 is preferably manufactured by electrochemical machining (ECM), a fabrication technology which is known in the art. FIG. 3 illustrates the basic configuration of apparatus used in an ECM process and the associated terminology. A rough forged, compacted, or machined piece of metal or workpiece, which is to be made into the BLISK 20, is provided. A cathode 34 is positioned adjacent to the portion of the piece of metal which eventually becomes the blade 24. In the illustrated preferred approach, two separate cathodes 34 are provided, one on a concave (or pressure) side 100 of the compressor blade 24, and the other on a convex (or suction) side 102 of the compressor blade 24.

There are gaps 30 between the respective cathodes 34 and the blade 24. A flow of electrolyte is forced into the gaps 30 in a direction parallel to the long axis of the compressor blade 24. In the view of FIG. 3, the flows of electrolyte are out of the plane of the illustration and are indicated as arrow points 32.

The compressor blade 24 is made the anode by applying to it a positive voltage relative to the cathodes 34. The applied voltage between the blade 24 and the cathodes 34 removes metal from the compressor blade 24 into the electrolyte 32. As metal is removed from the anode, the cathodes 34 are gradually moved closer to the anode (so that the gap 30 becomes smaller), until the shape of the surfaces of the cathodes 34 defines the shape of the anode and thence the shape of the compressor blade 24. Eventually, the gap 30 becomes as small as about 0.010 inch at the broad (airfoil) surfaces of the compressor blade 24.

The shapes of the cathode surfaces 36 that face the compressor blade 24 are therefore critical to making the compressor blade 24 of the correct aerodynamic shape. Desirably, the shapes of the cathode surfaces 36 could be made exactly correctly on the first try, but this is not possible with available technology. The complexity of the shape of the compressor blade 24, the irregularities in the flow of the electrolyte, uneven current densities, and other factors make it difficult to predict the required shapes of the cathodes that are required to attain the specified shape of the surfaces of the compressor blade 24. In conventional practice, typically 15–20 iterative attempts are required before the correct cathode shape is reached for a new BLISK design, even with experienced designers. The development of the cathode surfaces 36 for a new blade design often requires months of iterative design, machining, manufacturing, and evaluation.

Figure 4:
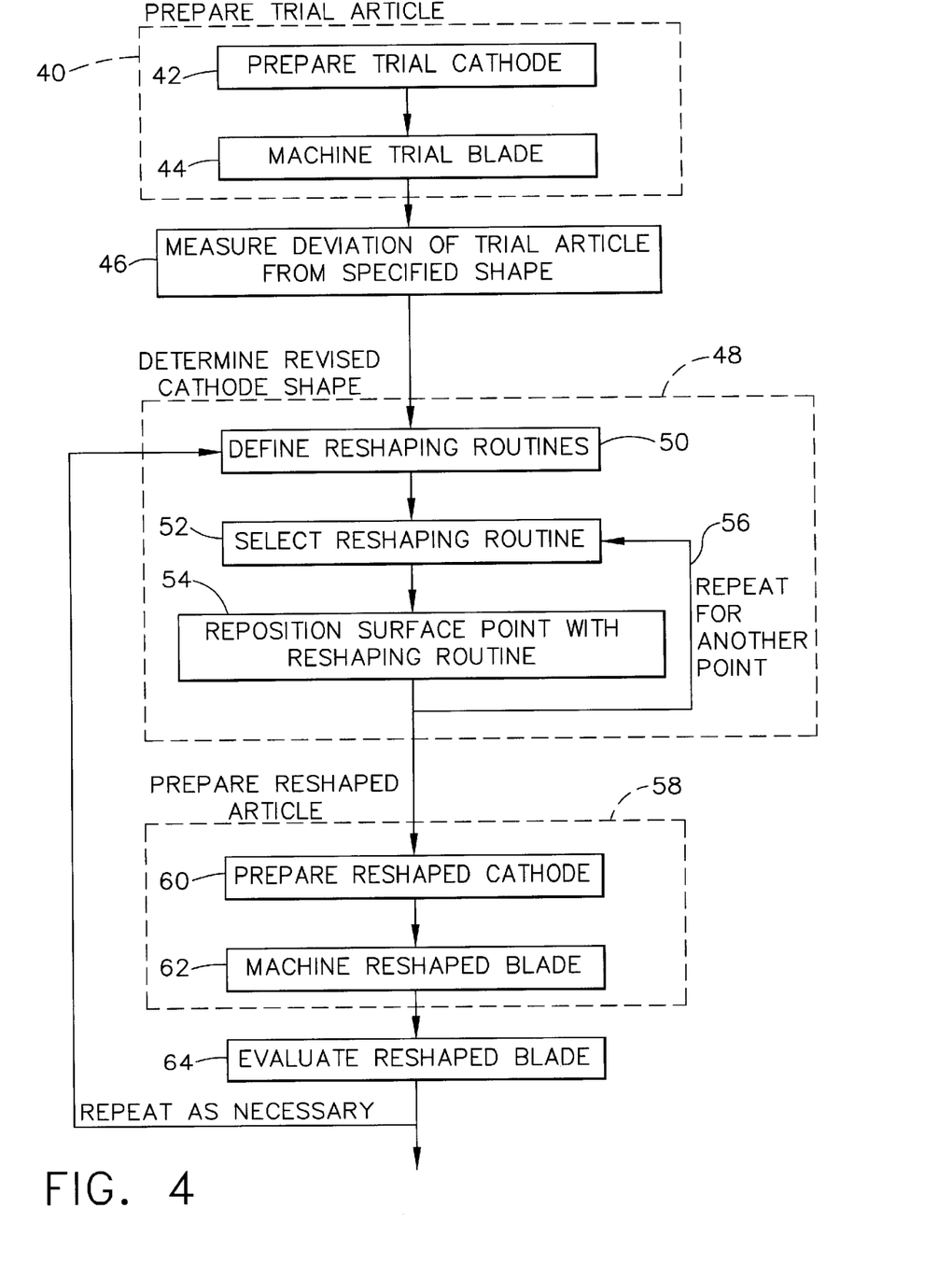
FIG. 4 is a block flow diagram of a method for preparing the BLISK of FIG. 1.

FIG. 4 is a block flow diagram of a preferred method for making a BLISK 20 by ECM, according to the present approach. FIG. 4 is specific to the preferred BLISK application, but it is more generally applicable to the preparation of other articles. A trial BLISK is prepared, numeral 40. The preparation of the trial BLISK includes the preparation of a trial cathode, numeral 42. The trial cathode usually reflects a best estimation of a cathode shape based upon experience. The trial cathode is used to make a trial blade with its airfoil by ECM, numeral 44.

The trial blade is measured to determine a set of deviations of the trial shape from a specified shape that is required in the final blade, numeral 46. These measurements are made to assess the shape of the blade in relation to specifications that are normally established for the blade. For example, the designer of the blade may specify parameters such as a chord length of the blade, thicknesses of the blade at various locations, and the shape of the blade at various locations.

Figure 5:
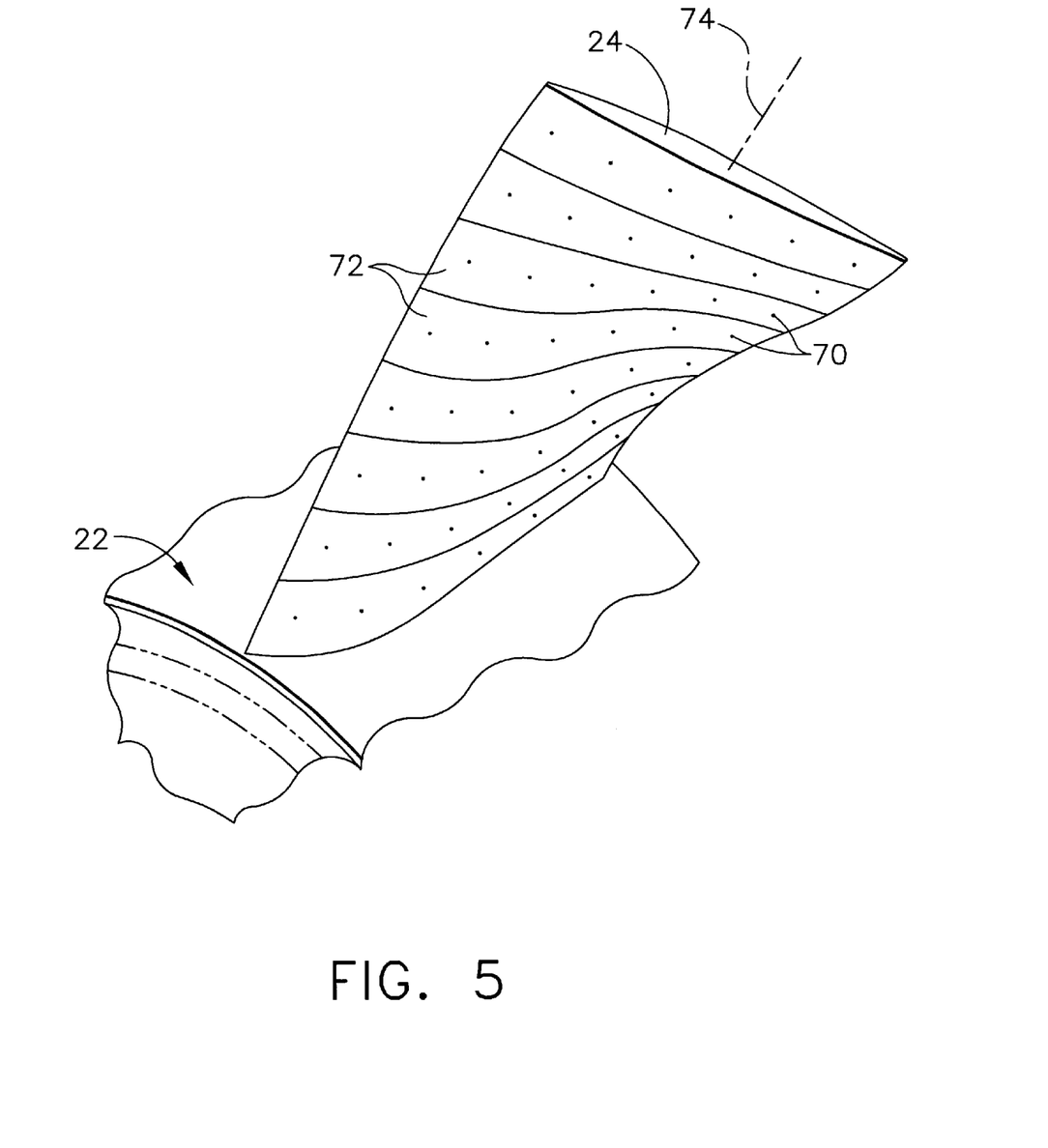
FIG. 5 is a three-dimensional representation of an arrangement of grid points that describe a portion of the surface of the compressor blade of the BLISK.

To facilitate the measurement and comparison process, the blade 24 is divided for analytical purposes into a series of surface grid points 70, as illustrated in FIG. 5. The preferred approach is to first divide the blade into a series of slices 72 extending perpendicular to a long axis 74 of the blade 24. Then the grid points 70 are defined in each slice 72. In a typical case of the blade 24 that is 1–3 inches long, there are 15 slices 72 and 112 grid points 70 per slice. In the grid point illustrations of FIGS. 7–12, far, fewer grid points 70 are shown to avoid clutter in the drawings. By comparing the shape of the trial blade with the specified shape on a point-by-point basis, a set of deviations of the trial shape from the specified shape on a point-by-point basis is obtained.

Figure 6:
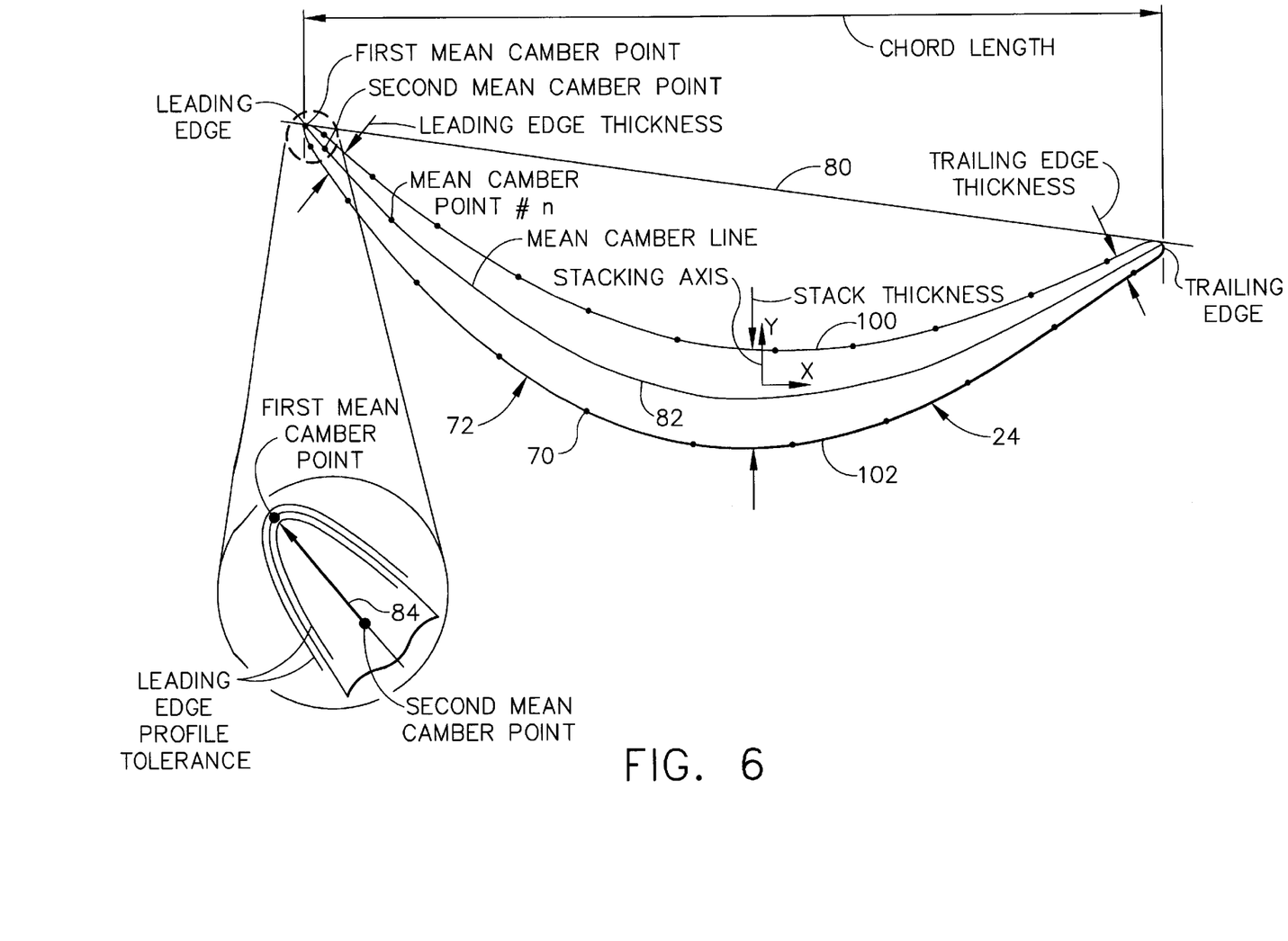
FIG. 6 is a schematic representation of an airfoil, indicating airfoil terminology, with an insert illustrating a leading edge profile tolerance.

FIG. 6 illustrates some terminology in relation to one of the slices 72 and the grid points 70. A chord length line 80, positioned on the concave side of the compressor blade 24, touches the compressor blade 24 at its leading and trailing edges. A mean camber line 82 bisects the compressor blade 24. A reference vector 84 is defined as the direction of the mean camber line 82 from a second mean camber point to a first mean camber point (the mean camber point at the leading edge). Leading edge thickness and trailing edge thickness at a specified distance from the respective leading edge and trailing edge are parameters specified by aerodynamicists who define the blade shape.

A set of revised shaping parameters is determined, numeral 48. In the case of ECM, the revised shaping parameters define the surface of a reshaped cathode that will be used to machine a reshaped blade. (The term "reshaped" indicates the preparation of a new shape that is a closer approximation of the desired shape than achieved in a prior iteration. "Reshaped" does not suggest that a part prepared in a prior machining operation is reworked in a subsequent machining operation to change its shape, although that may be possible in some situations.)

At least one, and typically several, reshaping routines are defined, numeral 50. The reshaping routines provide a toolbox for the cathode designer to vary its designed shape in meaningful ways relative to the specified shape. The reshaping routines are selected according to the specific article being machined. The inventors have found that six specific reshaping routines are useful in performing the reshaping of the cathode 34 and the blade 24 in the case of a BLISK blade. These six reshaping routines are illustrated in FIGS. 7–12, and discussed in the following paragraphs. In each case, an initial surface 90 and a reshaped surface 92 of the cathode are indicated.

Figure 7:
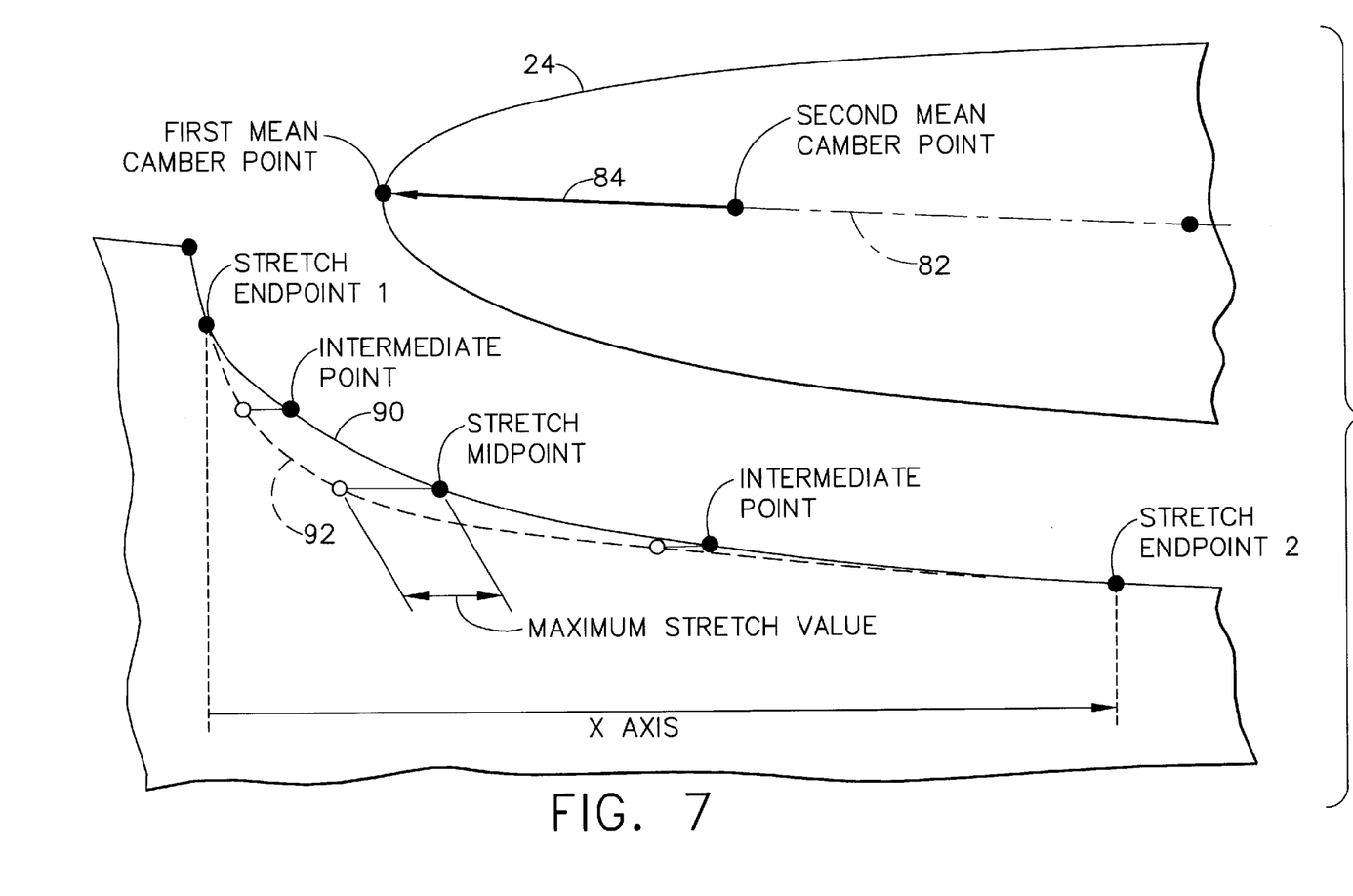
FIGS. 7–12 are two-dimensional representations of six reshaping routines useful for the design of BLISKs.

In a general stretch tool, illustrated in FIG. 7, the designer selects three endpoints and a maximum stretch value. "Stretch endpoint 1" and "stretch endpoint 2" define the boundaries of the curve section to be stretched. The "stretch midpoint" defines the point at which the maximum stretch value is to be applied. At "stretch endpoint 1" and "stretch endpoint 2" the value of the stretch (movement from the initial surface 90 to the reshaped surface 92) is zero. The direction of stretch is along the mean camber line reference vector 84, which is established as the vector from the second mean camber point to the first mean camber point. A positive stretch value is illustrated in FIG. 7. A negative stretch value would move points in the opposite direction along the mean camber line reference vector 84. The amount of stretch is automatically interpolated along the X axis between the maximum stretch value at the stretch midpoint and zero at the two stretch endpoints.

Figure 8:
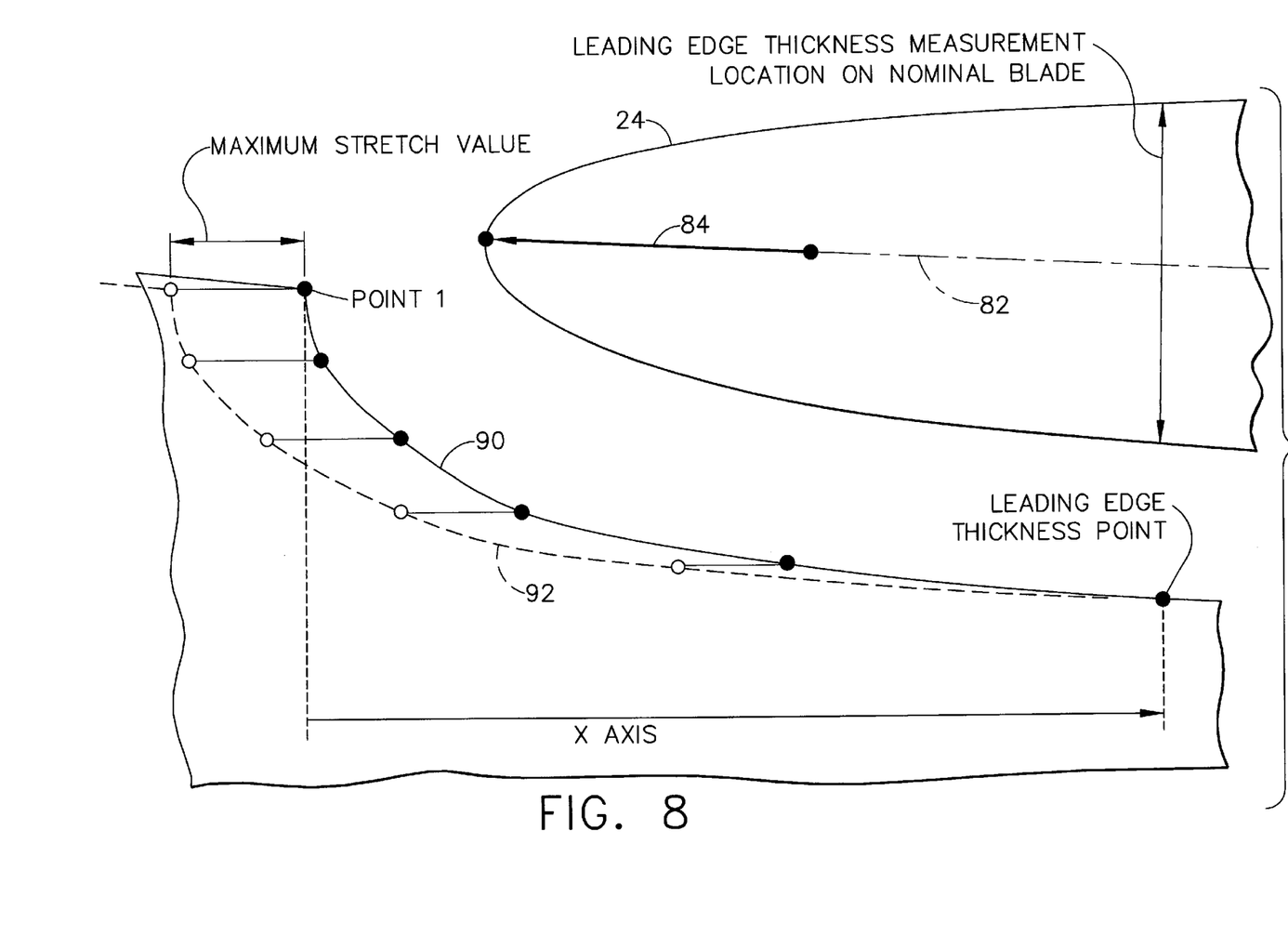

A chord change stretch tool, illustrated in FIG. 8, is a special case of the general stretch tool of FIG. 7. In the chord change stretch tool, the boundaries of the curve section to be impacted are defined by "point 1" and "leading edge thickness point". Point 1 is the extreme leading edge point of the cathode blade surface, and the leading edge thickness point is the cathode point lying closest to the location on the nominal airfoil curve where leading edge thickness is measured. The maximum stretch value is applied to point 1, and zero stretch is applied to the leading edge thickness point. At intermediate points the value of the stretch is automatically interpolated along the X axis between point 1 and the leading edge thickness point. The direction of stretch is along the mean camber line reference vector 84. A positive stretch value is illustrated in FIG. 8 and acts to increase the blade chord length. A negative stretch value moves the points in the opposite direction and tends to decrease the blade chord length. The overall intent of this tool is to increase airfoil chord length without impacting leading edge thickness or contour.

Figure 9:
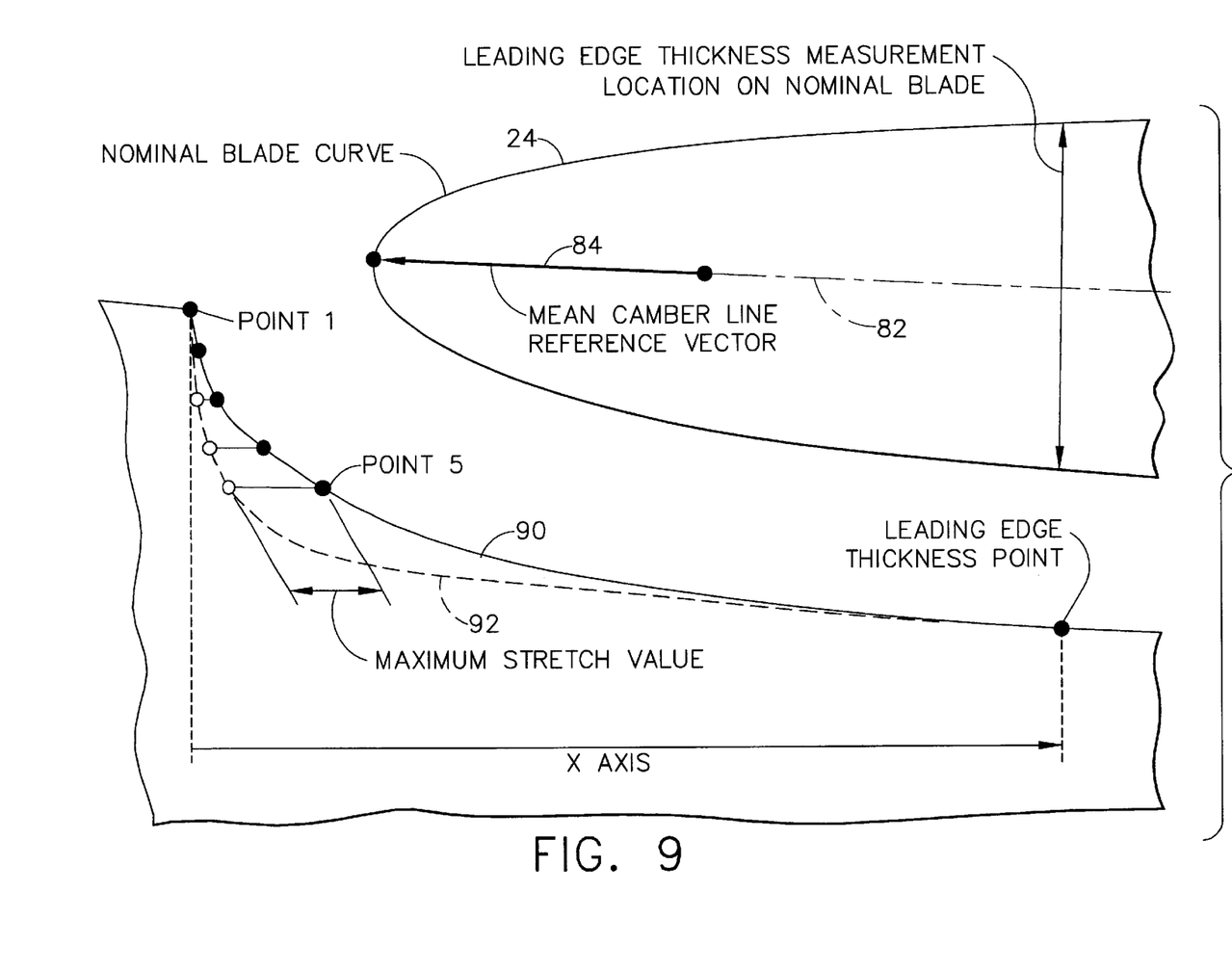

A radius change stretch tool, illustrated in FIG. 9, is another special case of the general stretch tool. In this radius change stretch tool, the boundaries of the curve section to be impacted are defined by "point 1" and the "leading edge thickness point". The maximum stretch is applied at an intermediate point, here indicated as point 5. At intermediate points between point 1 and point 5, on the one hand, and point 5 and the leading edge thickness point, on the other hand, the value of the stretch is automatically interpolated along the X axis. A positive stretch is illustrated in FIG. 9. The overall intent of this approach is to modify the radius of curvature of the cathode at the extreme leading edge in order to impact the leading edge profile on the blade.

Figure 10:
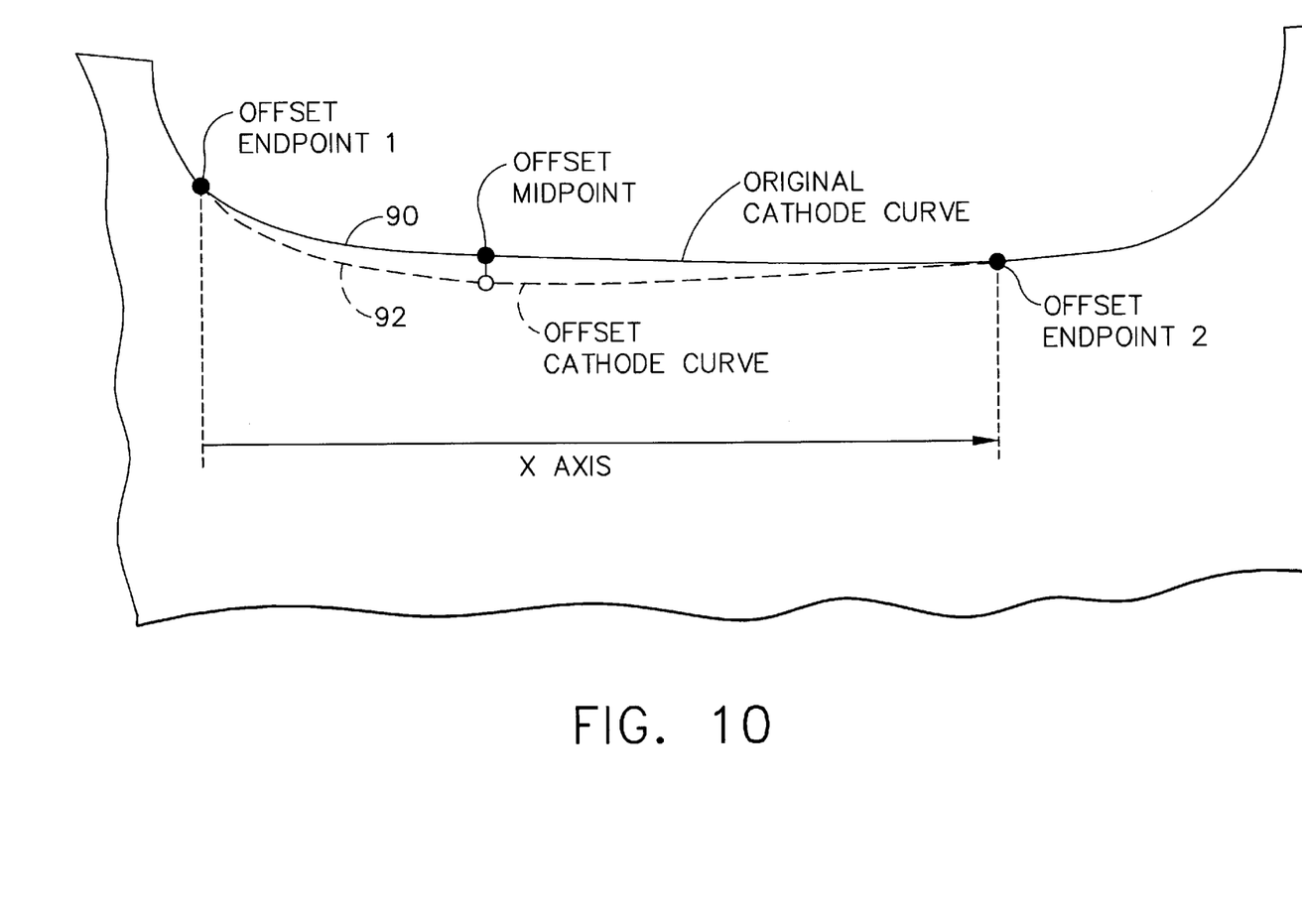

A general offset tool, illustrated in FIG. 10, allows the designer to select three points and a maximum offset value. An "offset endpoint 1" and an "offset endpoint 2" define the boundaries of the curve section to be offset. An "offset midpoint" defines the point at which the maximum offset is to be applied. At "offset endpoint 1" and "offset endpoint 2" the offset value is zero. At intermediate points the offset value is automatically interpolated along the X axis between the offset midpoint and the closest endpoint. The direction of offset at any point is perpendicular to the cathode surface 36 at that point. A positive offset value is illustrated in FIG. 10 and acts to add material to the blade. A negative offset value would act to remove material from the blade.

Figure 11:
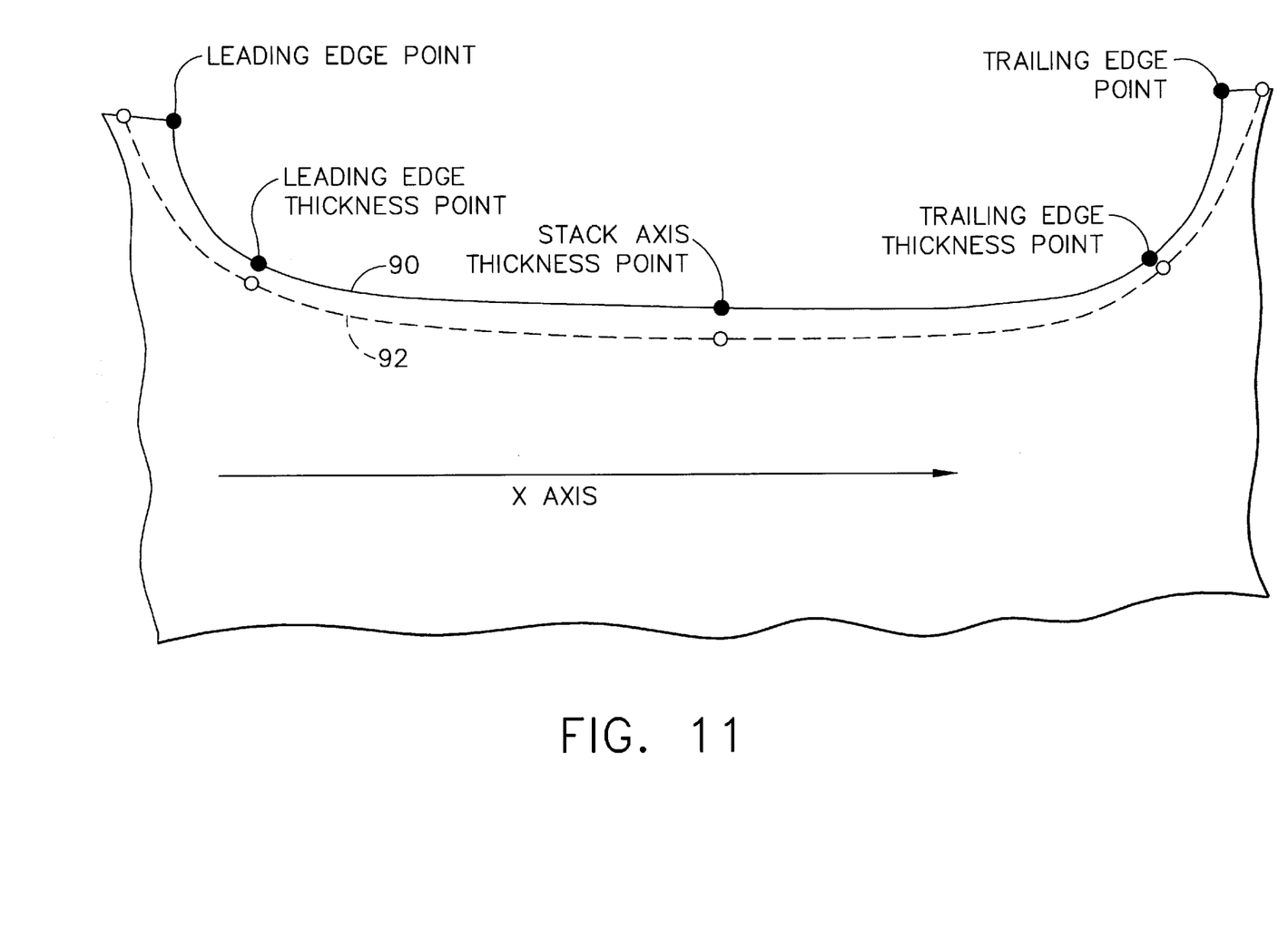

In a control point offset tool, illustrated in FIG. 11, the magnitudes and signs of offsets to be applied at five pre-specified control points are provided. The five control points are the cathode leading edge point, the trailing edge point, the leading edge thickness point, the trailing edge thickness point, and the stack axis thickness point. At intermediate points the offset value is automatically interpolated along the X axis between the associated control points. Offset at each point is applied perpendicular to the cathode surface 36 at that point. A positive offset value is illustrated in FIG. 11 and acts to add material to the blade. A negative offset value would act to remove material from the blade.

Figure 12:
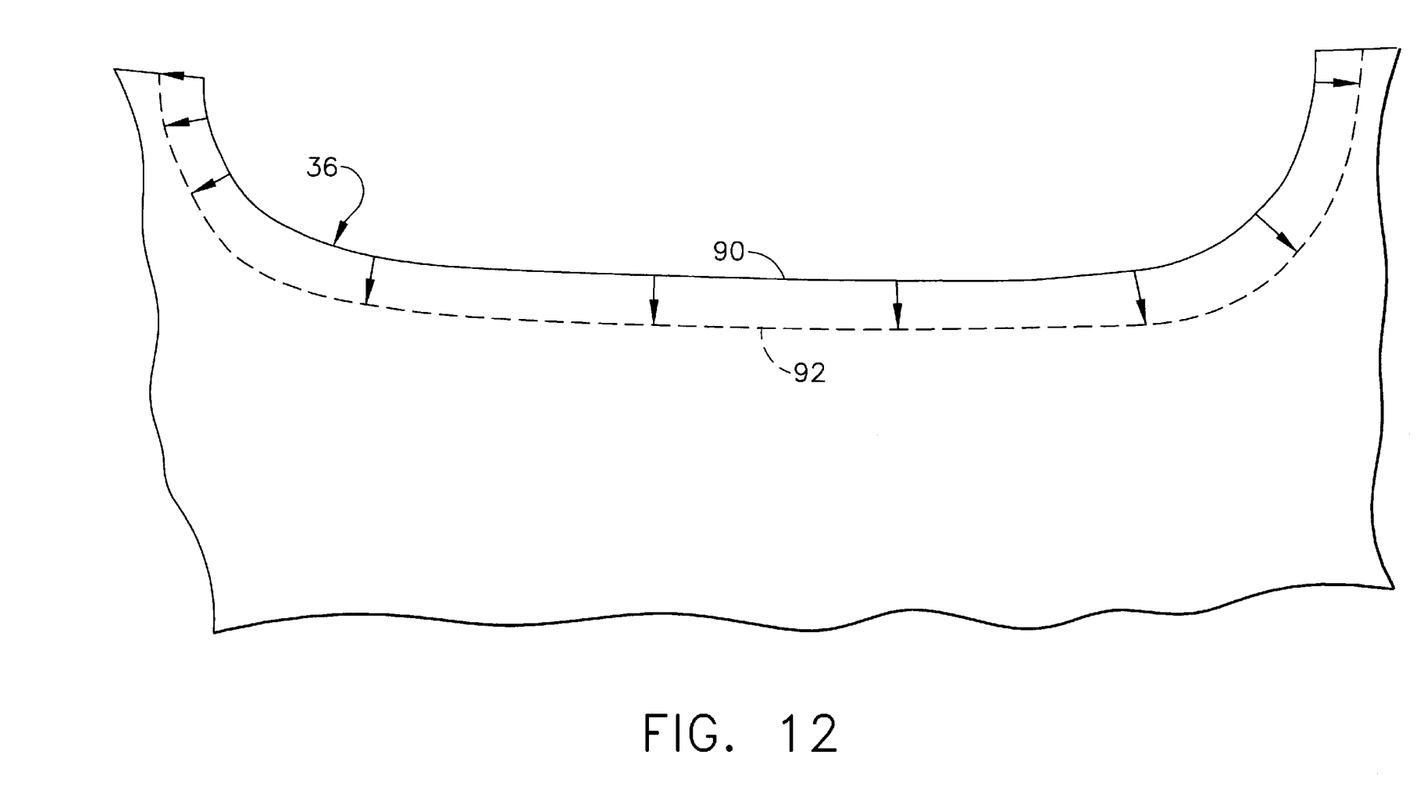

In a constant offset tool, FIG. 12, the designer specifies the magnitude and sign of a constant offset. The constant offset is then applied to all points on the cathode surface 36, in a local direction perpendicular to the cathode surface 36. A positive offset value illustrated in FIG. 12 adds material to the blade. A negative offset value would act to remove material from the blade.

Returning to FIG. 4, once the reshaping routines are defined, they are applied to the specific article being designed. To use the routines, a designer selects a shaping routine from among those defined in step 50, numeral 52. The selected shaping routine is applied to move a surface grid point to about its specified location, and the adjacent grid points are moved responsively in the manner discussed for each reshaping routine, numeral 54. The reshaping routine also maintains a smooth shape to the surface by interpolating the offsets. This reshaping procedure is repeated as many times as necessary for the points on the surface of the blade 24, numeral 56. With each repositioning, the computer implementation of the present invention keeps track of all of the positions of the grid points. Grid points may also be repositioned relative to each other along the spline of the blade. With a sufficient number of repositionings, all of the grid points lie within the limits of the stated tolerances from the specified locations. The revised shaping parameters, which define the shape of the reshaped cathode in this case, are thereby determined.

A reshaped blade is prepared, numeral 58. In this step, a new, reshaped cathode 34 is prepared, numeral 60. The reshaped cathode 34 is used to machine the reshaped blade, numeral 62. The shape of the reshaped blade is evaluated, numeral 64. If the surface of the reshaped blade is within the tolerance limits of the specified shape, the reshaped blade is the specified blade 24. If it is not within the tolerance limits, steps 52, 54, 56, 58, and 64 may be repeated as necessary.

In initial studies, it was found that only the one design iteration was necessary in most cases, and two iterations were necessary in some cases. This is compared to the 15–20 design iterations required for the prior tabular design process.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for producing a complexly shaped article having a smoothly varying specified shape, the method using a shaping process that operates with a set of shaping parameters, the method comprising the steps of:

preparing a trial article having a trial shape using the shaping process, wherein the set of shaping parameters is a set of trial shaping parameters;

measuring a set of deviations of the trial shape from the specified shape at a plurality of surface grid points on a surface of the trial article;

determining a set of revised shaping parameters, the step of determining including the steps of defining at least one reshaping routine specific to the shaped article, each reshaping routine repositioning at least one adjacent surface grid point responsive to a repositioning of a repositioned surface grid point, the reshaping routine including an automatic step of establishing a smoothly varying shape of the surface, selecting a selected reshaping routine, and repositioning a selected surface grid point using the selected reshaping routine, the reshaping routine responsively repositioning at least one adjacent surface grid point and establishing a smoothly varying shape of the surface; and preparing a reshaped article using the shaping process with the set of revised shaping parameters from the step of determining.

2. The method of claim 1, wherein the article is a compressor blade.

3. The method of claim 1, wherein the article is a compressor disk with integral compressor blades.

4. The method of claim 1, including an additional step, after the step of repositioning, of repeating the steps of selecting and repositioning for another surface grid point until all grid points on the surface of the trial shape are moved to locations defined by the specified shape, the steps of selecting, repositioning, and repeating producing the set of revised shaping parameters.

5. The method of claim 1, wherein the shaping process is electrochemical machining and the shaping parameters include the shape of a cathode of the electrochemical machining shaping process.

6. The method of claim 1, wherein the reshaping routine comprises a surface stretch routine.

7. The method of claim 1, wherein the reshaping routine comprises a surface offset routine.

8. A method for producing an article having a specified shape and comprising an integrated compressor disk and blades, the method using an electrochemical machining process having a cathode defined by a set of cathode shape parameters, the method comprising the steps of:

preparing a trial article having a trial shape using the electrochemical machining process having a cathode defined by a set of trial shape parameters;

measuring a set of deviations of the trial shape from the specified shape at a plurality of surface grid points on a surface of the trial article;

determining a set of revised cathode shape parameters, the step of determining including the steps of defining at least one reshaping routine specific to the shaped article, each reshaping routine repositioning at least one adjacent surface grid point responsive to a repositioning of a repositioned surface grid point, the reshaping routine including an automatic step of establishing a smoothly varying shape of the surface, selecting a selected reshaping routine, repositioning a selected surface grid point using the selected reshaping routine, the reshaping routine responsively repositioning at least one adjacent surface grid point and establishing a smoothly varying shape of the surface, and repeating the steps of selecting and repositioning for another surface grid point until all grid points on the surface of the trial shape are moved to locations defined by the specified shape, the steps of selecting, repositioning, and repeating producing the set of revised cathode shape parameters; and preparing a reshaped article using the electrochemical machining process and a reshaped cathode defined by the revised cathode shape parameters.

9. The method of claim 8, wherein the reshaping routine comprises a surface stretch routine.

10. The method of claim 8, wherein the reshaping routine comprises a surface offset routine.

11. A method for shaping a tool used in machining an article, the method comprising the steps of:

providing an initial tool shape;

defining a set of shape parameters useful in defining the tool shape; defining at least one reshaping routine specific to the article being machined;

determining a set of revised shaping parameters using at least one of the reshaping routines; and refining the initial tool shape using the revised shape parameters.

12. The method of claim 11 wherein the step of defining the reshaping routines comprises defining a smoothly varying shape of a surface.

13. The method of claim 11 wherein the article comprises an integrally bladed rotor.

14. The method of claim 11 wherein the tool comprises a cathode for use in electrochemical machining.

15. The method of claim 11 wherein at least one of the reshaping routines comprises information related to airfoil shape definition.

16. The method of claim 15 wherein the information related to airfoil shape definition is selected from the group comprising chord length, leading edge radius of curvature, and combinations thereof.

17. The method of claim 11, further comprising measuring a set of deviations of trial article shape from a desired article shape.

18. The method of claim 11 wherein at least one reshaping routine comprises a surface stretch routine.

19. The method of claim 11, wherein at least one reshaping routine comprises a surface offset routine.

* * * * *